(12) United States Patent
Hu et al.

(10) Patent No.: US 9,767,770 B2
(45) Date of Patent: Sep. 19, 2017

(54) COMPUTER SYSTEM AND METHOD THEREOF FOR SCALABLE DATA PROCESSING

(71) Applicant: American Megatrends Inc., Norcross, GA (US)

(72) Inventors: Chih-Kai Hu, Taipei (TW); Xuan-Ming Huang, Taipei (TW)

(73) Assignee: AMERICAN MEGATRENDS INC., Norcross, GA (US)

( * ) Notice: Subject to any disclaimer, the term of this patent is extended or adjusted under 35 U.S.C. 154(b) by 0 days.

(21) Appl. No.: 14/980,070

(22) Filed: Dec. 28, 2015

(65) Prior Publication Data
US 2017/0186409 A1   Jun. 29, 2017

(51) Int. Cl.
| | |
|---|---|
| *G06F 15/167* | (2006.01) |
| *G09G 5/395* | (2006.01) |
| *G09G 3/20* | (2006.01) |
| *G06T 1/20* | (2006.01) |

(52) U.S. Cl.
CPC ............ *G09G 5/395* (2013.01); *G06T 1/20* (2013.01); *G09G 3/2088* (2013.01); *G09G 2360/18* (2013.01); *G09G 2370/02* (2013.01); *G09G 2370/10* (2013.01); *G09G 2370/24* (2013.01)

(58) Field of Classification Search
CPC .. G09G 3/2088; G09G 5/395; G09G 2370/24; G09G 2370/10; G09G 2370/02; G09G 2360/18; G06T 1/20
See application file for complete search history.

(56) References Cited

U.S. PATENT DOCUMENTS

| | | | | |
|---|---|---|---|---|
| 8,310,494 | B2 * | 11/2012 | Hendry | G06T 1/20 345/506 |
| 8,427,491 | B2 * | 4/2013 | Keslin | G06F 9/5044 345/506 |
| 9,026,615 | B1 * | 5/2015 | Sirton | H04L 65/60 709/217 |
| 9,286,022 | B2 * | 3/2016 | Stanley | G06F 3/14 |
| 2005/0041031 | A1 * | 2/2005 | Diard | G06T 15/005 345/505 |
| 2005/0204057 | A1 * | 9/2005 | Anderson | H04L 29/06027 709/236 |

OTHER PUBLICATIONS

Ma et al., A Data Distributed, Parallel Algorithm for Ray-Traced vol. Rendering, Dec. 1993, IEEE, pp. 15-22 and 105.*

* cited by examiner

*Primary Examiner* — Robert Craddock
(74) *Attorney, Agent, or Firm* — McClure, Qualey & Rodack, LLP

(57) ABSTRACT

A computer system for processing of data received from a remote device. The computer system includes a master device and at least one slave device. The master device is communicably coupled to the remote device and has a display and a memory. The master device partitions the data into one or more sub data. The at least one slave device is coupled to the master device. The master device delegates processing of the one or more sub data to one or more of the at least one slave device, and the one or more of the at least one slave device correspondingly to the one or more sub data generate processed sub data. The master device stores the processed sub data and outputs the processed sub data to the display.

7 Claims, 4 Drawing Sheets

COMPUTER SYSTEM AND METHOD THEREOF FOR SCALABLE DATA PROCESSING

BACKGROUND

1. Technical Field

The present disclosure generally relates to a computer system and method thereof for scalable data processing; particularly, the present disclosure relates to a computer system and method thereof for processing video data from remote device.

2. Description of the Related Art

Traditionally, computing systems may remotely control another computing device by communicably connecting to the remote computing device. Typically, the remote computing device generates video output which the computer system can receive and display for users. This video output by the remote computing device is typically encoded in the remote computing device's native resolution and transmitted to the computing system that is remotely controlling the remote computing device.

As illustrated in FIG. 1 of a typical computing system 20, the computing system 20 is connected to a display 10 and can connect to a remote computing device 40 via internet 30. The remote computing device 40 typically generates a video output that can be received by the computing system 20 and displayed on the display 10. In this manner, users can control and manage the remote device 40 through the computing system 20. As technology has progressed, demand for higher video resolutions has made it necessary for users to replace their original computing system 20 in order to support the higher resolution videos generated by newer versions of remote devices 40. However, for large corporations, this would mean that large quantities of computing systems 20 would need to be replaced, wherein the old computing systems 20 would either be thrown out as waste or stockpiled in storage to gather dust.

Therefore, there is a need to make better use of these old hardware platforms such that their hardware limitations may be overcome and still be applicable for use with current remote devices for video displaying.

SUMMARY

It is an objective of the present disclosure to provide a computing system and a method thereof for dynamic scalable data processing.

It is another objective of the present disclosure to provide a computing system and a method thereof for overcoming hardware limitations of a single data processing device.

According to one aspect of the invention, a computer system for processing of data received from a remote device is provided. The computer system includes a master device and at least one slave device. The master device is communicably coupled to the remote device and has a display and a memory. The master device partitions the data into one or more sub data. The at least one slave device is coupled to the master device. The master device delegates processing of the one or more sub data to one or more of the at least one slave device, and the one or more of the at least one slave device correspondingly to the one or more sub data generate processed sub data. The master device stores the processed sub data and outputs the processed sub data to the display.

According to another aspect of the invention, a method is provided. The method includes: initiating a connection from a master device to a remote device; receiving data from the remote device; partitioning the data into a plurality of sub data; delegating the plurality of sub data to one or more slave devices; storing processed sub data from the slave devices in a shared memory; transferring all the processed sub data in the shared memory to a frame buffer; and outputting the data from the frame buffer to display.

DETAILED DESCRIPTION OF THE PREFERRED EMBODIMENT

Embodiments of the present invention provide methods and systems for supporting parallel processing of video data through a shared memory structure. In the following detailed description, references are made to the accompanying drawings that form a part hereof, and in which are shown by way of illustration specific embodiments or examples. These embodiments are only illustrative of the scope of the present invention, and should not be construed as a restriction on the present invention. Referring now the drawings, in which like numerals represent like elements through the several figures, aspects of the present invention and the exemplary operating environment will be described.

The present disclosure provides a computing system and method thereof for supporting partitioning of video data to delegate to a plurality of slave devices under parallel processing. Preferably, the computer system may include (but not limited to) thin clients, laptop computers, personal computers, computer servers, handheld computing devices such as mobile telephones and tablet computers, and wearable computing devices.

Figure 1:
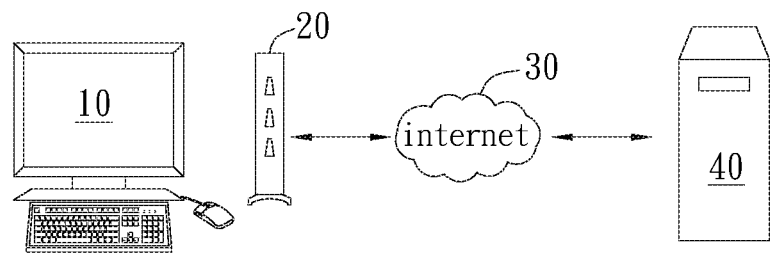
FIG. 1 is a view of a conventional computer system for remote access of a remote device.
Figure 2:
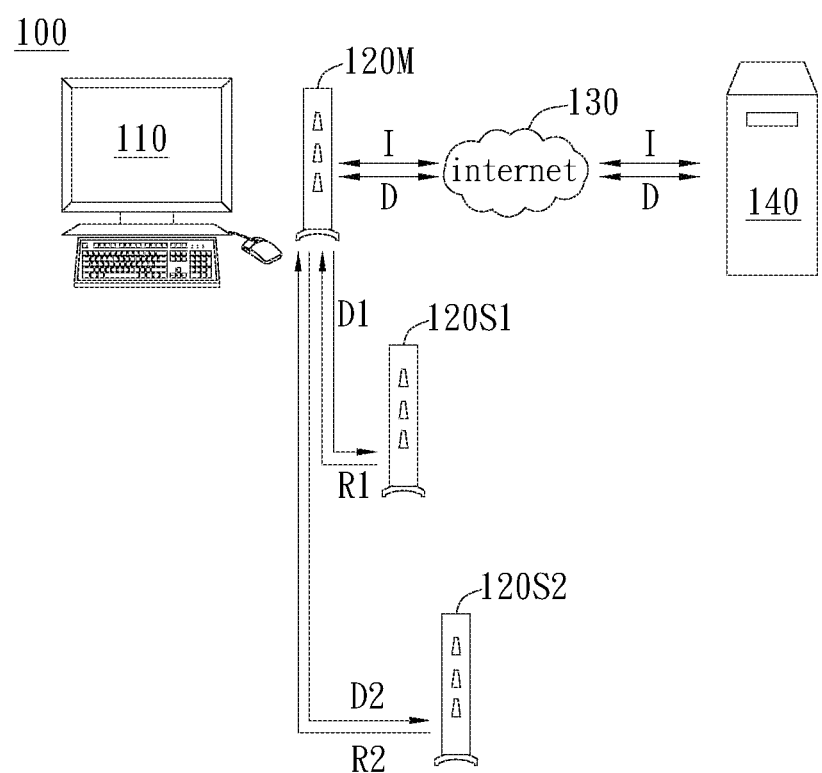
FIG. 2 is a view of an embodiment of the computer system of present invention.

FIG. 2 and the following discussion are intended to provide a brief, general description of a suitable computing environment in which the invention may be implemented. However, those skilled in the art will recognize that the invention may also be implemented in other suitable computing environments. Moreover, those skilled in the art will appreciate that the invention may also be practiced with other computer system configurations, including multiprocessor systems, microprocessor-based or programmable consumer electronics, minicomputers, mainframe computers, and the like. The invention may also be practiced in distributed computing environments where tasks are performed by remote processing devices that are linked through a communications network.

As illustrated in FIG. 2 of an embodiment of the computer system 100 of the present invention, the computer system 100 includes a master device 120M, a display 110, and at least one slave device 120S1. In the present embodiment, the master device 120M is preferably a thin client device for connecting to a remote device 140. However, the master device 120M is not restricted to being a thin client device. In other different embodiments, the master device 120M may also be a tablet computer, a handheld computing device, or any other computer device capable of data processing.

As shown in FIG. 2, the master device 120M is connected to the remote device 140 via internet 130. In the present embodiment, the remote device 140 is preferably a server computer; however, in other different embodiments, the remote device 140 may also be a desktop computer or any other computer device. By connecting to the remote device 140, master device 120M may remotely transmit instructions I to the remote device 140 and receive the video output, video data D, of the remote device 140. The master device 120M would then normally display the video data D on the display 110. In this manner, users may control the remote device 140 remotely through the interface of the display 110 and master device 120M. For instance, upon establishing a connection to the remote device 140 via internet 130, master device 120M may receive from the remote device 140 steaming video data D of the desktop display of the remote device 140. In the present embodiment, in terms of data transmission over the internet 130 between the master device 120M and the remote device 140, data transmission between the master device 120M and the remote device 140 is preferably conducted over the TCP/IP protocols. That is, the instructions I and the video data D are encoded into network packets and transmitted through the internet 130 between the master device 120M and the remote device 140. Upon receiving the network packets from the remote device 140, the master device 120M would decode the received network packets into the video data D. Similarly, the remote device 140 would decode any received network packets into the instructions I.

As illustrated in FIG. 2, in the circumstance where the video resolution outputted by the remote device 140 exceeds the range that the master device 120M can singularly and optimally handle without degradation in performance in display and/or speed, the master device 120M may not be able to display the video data D outputted by the remote device 140. For instance, the video data D outputted by the remote device 140 and received by the master device 120M may call for video to be displayed at 60 hz at a resolution of 1920×1080 pixels, but the master device 120M can only optimally handle resolutions of 720×480 pixel without performance degradation in display and speed due to hardware limitations (ex. processing power, memory limitations, etc) of the master device 120M. In this circumstance, the master device 120M would ordinarily not be able to display the video data D at its recommended setting, and would either need to scale down the video data D, or have the remote device 140 transmit a scaled down version of the video data D for the master device 120M to handle.

In order to overcome this hardware limitation of the master device 120M, in the present embodiment, the master device 120M may be connected to one or more slave devices (such as slave device 120S1 and slave device 120S2). Although FIG. 2 illustrates only two slave devices 120S1 and 120S2 being connected to the master device 120M, in other embodiments the master device 120M may be connected to even more slave devices. In the present embodiment, slave devices may include thin client devices, desktop computers, tablet computers, handheld computing devices, or any other data processing devices. Although the slave devices 120S1 and 120S2 are illustrated in FIG. 2 as being connected directly to the master device 120M, the computer system 100 is not limited or restricted to only this format. In other different embodiments, slave devices may be connected to the master device 120M over the internet, and/or the slave devices may be connected indirectly to the master device 120M through a switching or routing device such as a Keyboard-Video-Mouse over IP device (KVM over IP).

As shown in FIG. 2, once the slave device 120S1 and 120S2 are connected to the master device 120M, the master device 120M can detect that there are two slave devices connected. Accordingly, the master device 120M can then partition or divide the video data D into smaller sub data (portions) D1 and D2, and distribute them respectively to the slave devices 120S1 and 120S2 for further data processing. In other words, the master device 120M may utilize or harness the processing power of the slave devices 120S1 and 120S2 to video process the video data D. After the slave devices 120S1 and 120S2 complete video processing of the sub data D1 and D2, the slave devices 120S1 and 120S2 will respectively return to the master device 120M the processed sub data R1 and R2. The master device 120M then subsequently outputs the processed sub data R1 and R2 as video data to the display 110.

Figure 3:
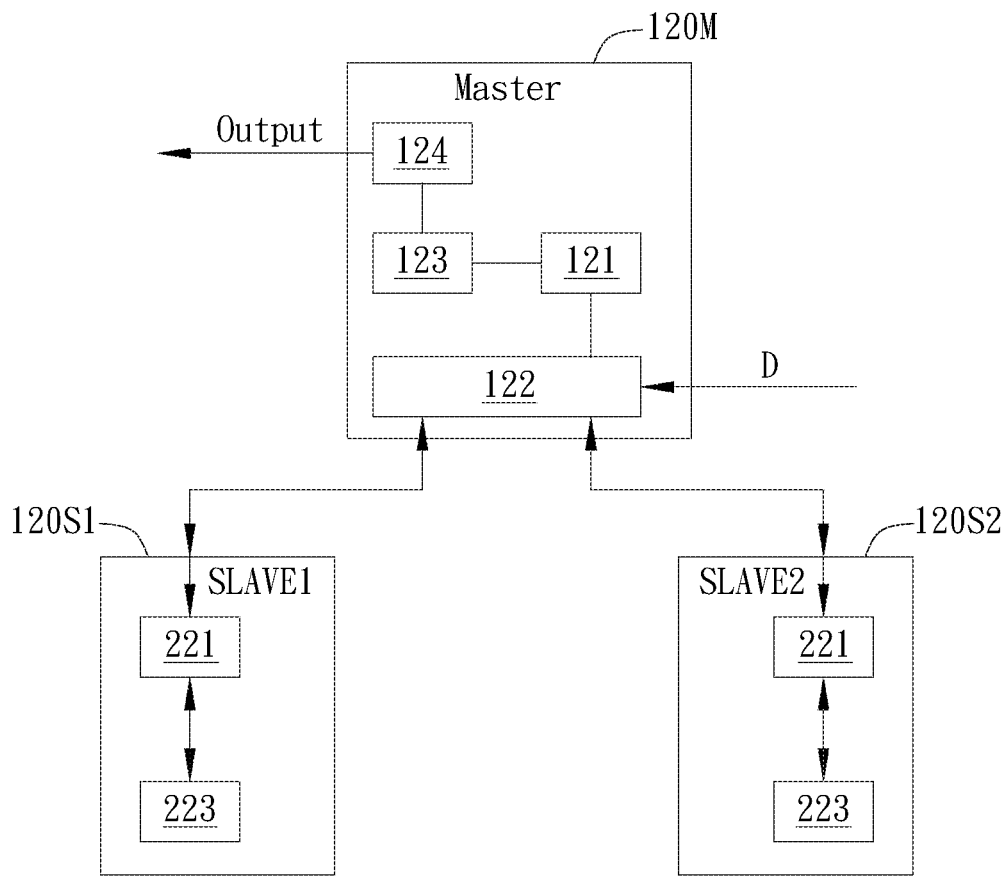
FIG. 3 is a view of an embodiment of the master device and slave device of the present invention.

FIG. 3 illustrates an embodiment of the master device 120M and the slave devices 120S1 and 120S2 of FIG. 2. As shown in FIG. 3, the master device 120M includes processor unit 121, communication module 122, shared memory 123, and frame buffer 124. The processor unit 121, in this and other embodiments, may include one or more of a microprocessor, a microcontroller, a field programmable gate array (FPGA), a complex programmable logic device (CPLD), an application specific integrated circuit (ASIC), and/or any other data processor. The shared memory 123 and frame buffer 124 may both be considered as data storages of the master device 120M, and may include volatile or non-volatile memory (ex. Random Access Memory, Hard Drive Memory, Solid-State Drive memory, and the like). Although the shared memory 123 and the frame buffer 124 are separately illustrated in the present embodiment of FIG. 3, in other different embodiments, the shared memory 123 and the frame buffer 124 may be the same entity and/or physically be located on the same memory unit in the master device 120M. Similarly, as illustrated in FIG. 3, the slave devices 120S1 and 120S2 both respectively have processor units 221 and memory modules 223, wherein the processor units 221 and memory modules 223 may be similar in construction to the processor unit 121 and shared memory 123/frame buffer 124.

The master device 120M communicates with the remote device 140 and the slave devices 120S1 and 120S2 through the communication module 122. In the present embodiment, the communication module 122 may include (but is not limited to) network interface controllers, and may include wired or wireless capabilities. In other different embodiments, the communication module 122 may also include other data transmission interfaces, such as Universal Serial Bus interfaces, serial ports, RS-232 connector ports and the like.

Referring to FIGS. 2 and 3, when the master device 120M receives video data D in the communication module 122 from the remote device 140, the processor unit 121 of the master device 120M will first determine that there are two slave devices currently connected to the master device 120M in the present embodiment. Based on this determination, the master device 120M may partition the video data D into two equal portions of sub data D1 and D2, and then transmit the sub data D1 and D2 to the slave devices 120S1 and 120S2 respectively. When the sub data D1 is received at the slave device 120S1, the slave device 120S1 may temporarily store the sub data D1 in the memory module 223 and then video process the sub data D1 before returning the processed sub data D1 as processed sub data R1 to the master device 120M.

Similarly, the slave device 120S2 also processes the sub data D2 and returns processed sub data R2 to the master device 120M, wherein the master device 120M then proceeds to directly output both the processed sub data R1 and R2 as a video stream to the display 110.

In the present embodiment, although it was mentioned that the master device 120M partitions the video data D into equal portions of sub data according to the number of connected slave devices that the master device 120M can detect, in other different embodiments the master device 120M can partition the video data D into different sized portions of sub data and/or selectively transmit sub data to certain slave devices. For instance, in one embodiment, the master device 120M may detect or receive the load statuses of the slave devices and can accordingly determine the optimum sub data sizes that each slave device can handle. In other different embodiments, the master device 120M may detect or receive information from the slave devices their respective processing speeds and/or estimated data processing completion times. The master device 120M can then accordingly dynamically delegate the processing of the sub data to slave devices that would provide the fastest video processing time. In this manner, the master device 120M can dynamically scale up or scale down the number of slave devices it employs to complete the processing of the video data D to provide the best optimal video display performance.

Figure 4:
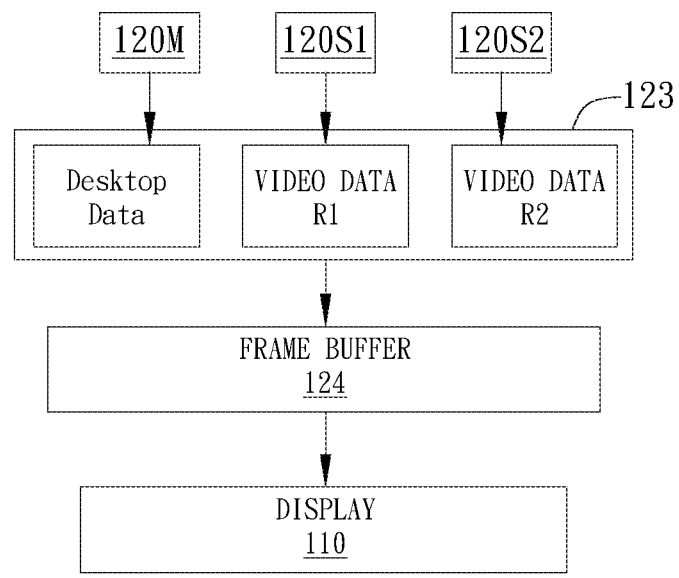
FIG. 4 is a view of the flow of data through the master device.

FIG. 4 is an embodiment of an abstract structure of the data flow of the video data D through the master device 120M of FIGS. 2 and 3. As shown in FIGS. 2-4, when the master device 120M receives the video data D, the video data D will be partitioned into one or more portions of sub data, wherein these sub data (such as sub data D1 and D2) are transmitted to slave devices 120S1 and 120S2 for further video processing. When the master device 120M receives the processed sub data R1 and R2 (processed partial video data) respectively from the slave devices 120S1 and 120S2, the master device 120M records the processed sub data R1 and R2 into the shared memory 123 in the same sequence that the video data D was partitioned and delegated to the slave devices. The master device 120M may also record any other data pertaining to encoding/decoding formats of the processed sub data R1 and R2, and/or any desktop data relevant to displaying on the display 110.

In the present embodiment, the shared memory 123 is a virtual memory residing in the master device 120M and is for storing all processed sub data received from the slave devices. In essence, the shared memory 123 acts like a memory that is shared with all the slave devices since it is like slave devices are writing their respective processed sub data into the shared memory 123 of the master device 120M. When all processed sub data (ex. R1 and R2) are aggregated in the shared memory 123 and are all accounted for in the context of their corresponding sub data (ex. D1 and D2), the master device 120M will memory map the data stored in the shared memory 123 to frame buffer 124. In the present embodiment, data stored in the frame buffer 124 is used to drive video display of the display 110. In other words, after the processed sub data R1 and R2 are memory mapped from virtual memory to the physical memory of the frame buffer 124, data in the frame buffer 124 is directly outputted to the display 110 for video display. In this manner, the master device 120M essentially has not done any video processing of the video data D since the slave devices have each video processed portions of the video data D and these processed portions are then directly outputted by the master device 120M to the display 110. In this manner, by dynamically building a network of slave devices and harnessing the processing powers of these slave devices, the master device 120M is able to output video of higher resolutions that it originally would not have been able to adequately handle.

Figure 5:
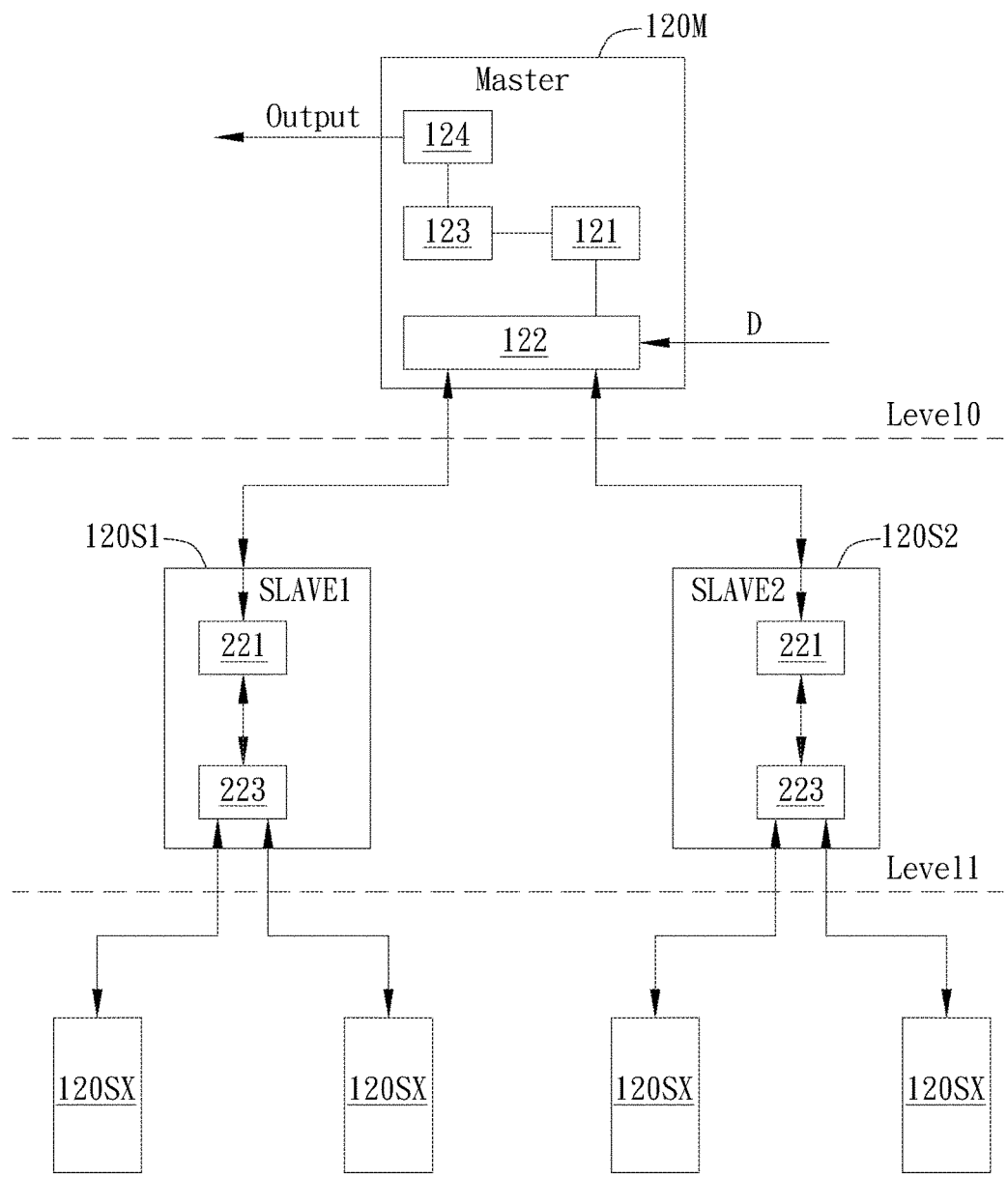
FIG. 5 is another embodiment of the computer system of FIG. 3.

FIG. 5 is another embodiment of the FIG. 3, wherein a plurality of slave devices 120SX may act as a child node of slave devices 120S1 and 120S2. As illustrated in FIG. 5, slave devices 120S1 and 120S2 are directly connected to the master device 120M. As such, in the hierarchy of the structure illustrated in FIG. 5 with the master device 120M at level 0, the slave devices 120S1 and 120S2 would be at level 1. In the present embodiment, therefore, each slave device 120S1 and 120S2 in level 1 can be connected to even more slave devices 120SX. In order to improve processing time of the video data D, the slave devices 120S1 and 120S2 can also partition the sub data D1 and D2 into even smaller portions and delegate the video processing of those portions to their respective slave devices 120SX. In addition, it should easily be understood that at each level below the master device 120M, any number of slave devices may exist. For instance, there may be many more slave devices other than the slave device 120S1 and 120S2 directly connected to the master device 120M (and likewise for the slave devices under these devices in level 1). In other words, the structure illustrated in FIG. 5 may be dynamically scaled up or down in the horizontal direction and/or vertical direction at each level of the structure to suit the performance needs of the computer system 100.

Figure 6:
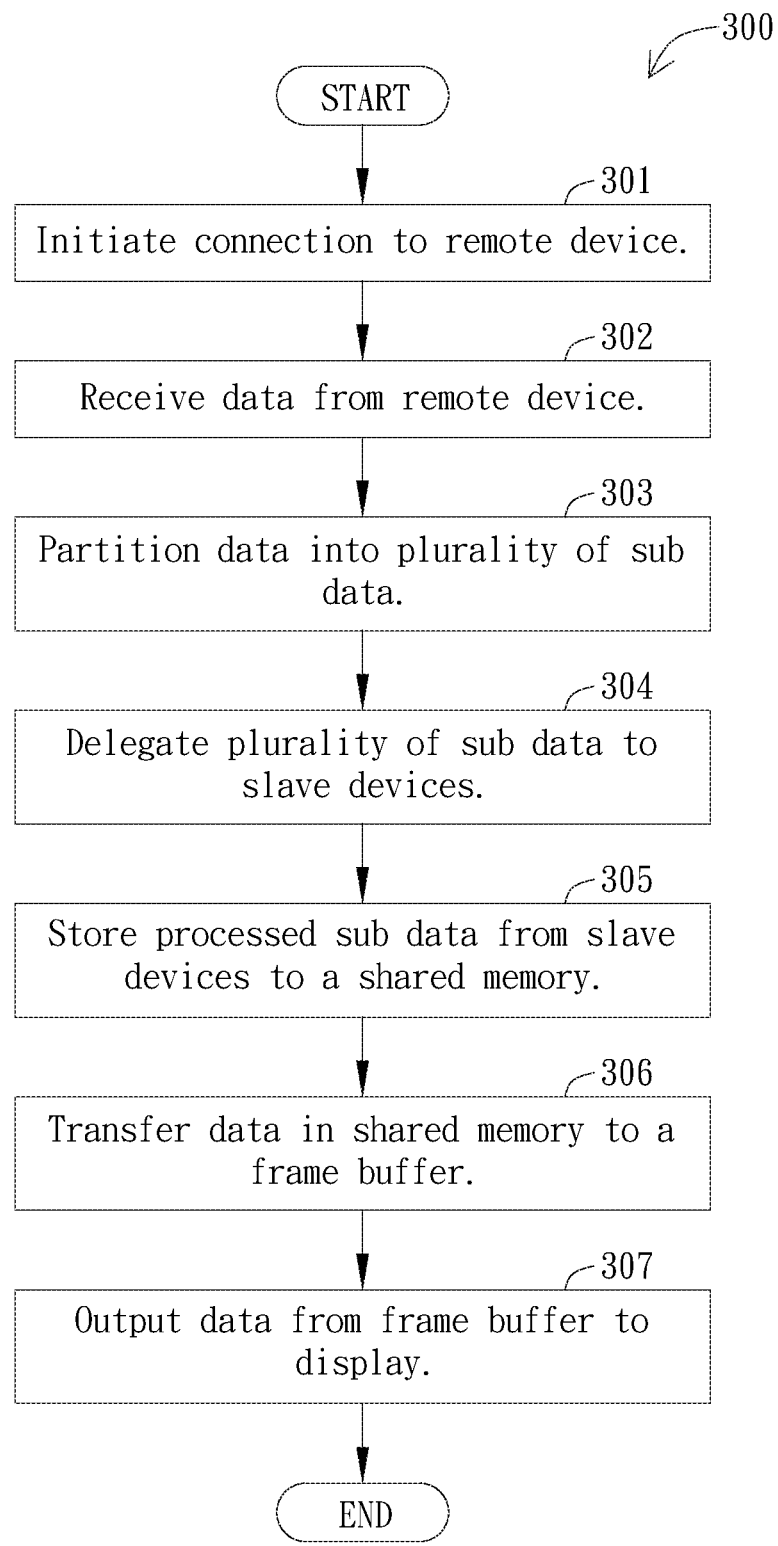
FIG. 6 is a flowchart of the method of data processing of the computer system.

FIG. 6 is a flowchart of a method of data processing of the present invention. As illustrated in FIG. 6, the method 300 includes steps 301-307 and are described with the accompanying FIGS. 1-5 in detail in the following:

Step 301 includes initiating a connection from the master device 120M to the remote device 140. In the present embodiment, the master device 120M may directly or indirectly establish communication connection with the remote device 140 in order to transmit instructions to the remote device 140 and receive video data D and responses from the remote device 140. In other words, in the present embodiment, the master device 120M is used as an interface by users to control or operate the remote device 140.

Step 302 includes receiving data from the remote device 140. Specifically, the master device 120M can receive video data D from the remote device 140 for displaying on the display 110. The video data D is the video output generated by the remote device 140 and may be in response to the instructions I transmitted by the master device 120M to the remote device 140. For instance, the master device 120M may transmit mouse input instructions to the remote device 140, and the video data D returned by the remote device 140 would reflect video with the mouse movements/actions as interpreted by the remote device 140.

Step 303 includes partitioning the data into a plurality of sub data. In the present embodiment, upon receiving the video data D from the remote device 140, the master device 120M will partition the video data D into one or more portions of sub data. In one embodiment, the master device 120M can first determine the number of slave devices directly connected to the master device 120M. Based on the determination of the number of connected slave devices, the master device 120M can partition the video data D into a corresponding number of portions/sub data, wherein each portion may be equal or not equal in size. In another embodiment, the master device 120M can determine the load statuses and/or processing powers of each connected slave device, and then accordingly partition the video data D into portions of sub data that each slave device can optimally handle.

Step 304 includes delegating the plurality of sub data to one or more of the slave devices. In the present embodiment, the video processing of each of the sub data of the video data D is delegated to slave devices. The master device 120M can dynamically determine, based on load statuses and/or processing powers of the slave devices, which slave devices should perform video processing for the master device 120M.

Step 305 includes storing processed sub data from the slave devices in the shared memory 123. In the present embodiment, the after each slave device has completed their respective video processing, the master device 120M will subsequently receive all the processed sub data from the different slave devices. These processed sub data are stored in the shared memory 123.

Step 306 includes transferring all the processed sub data in the shared memory 123 to a frame buffer. In the present embodiment, the shared memory 123 is a virtual memory that essentially acts a place where all slave devices involved in the video processing can write their processed sub data. Therefore, in order to output this aggregated processed sub data, the virtual memory of the shared memory 123 is memory mapped to frame buffer 124 in preparation for Step 307 of outputting to the display 110. However, in other different embodiments, the shared memory 123 and the frame buffer 124 can be one of the same, wherein processed sub data is stored and aggregated therein and directly outputted to the display 110.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A method comprising:
   initiating a connection from a master computer device to a remote computer device;
   receiving an image data corresponding to an image frame a from the remote computer device;
   partitioning the image data in the master computer device into a plurality of video sub data;
   delegating, by the master computer device, the plurality of video sub data to at least two slave computer devices;
   storing, by the master computer device, processed image sub data from the slave computer devices into a shared memory in the master computer device;
   transferring all the processed image sub data in the shared memory to a frame buffer in the master computer device;
   outputting all the processed image sub data from the frame buffer to a display as the image frame;
   wherein the step of delegating the plurality of image sub data to at least two slave computer devices further comprises:
      at least one of the at least two slave computer devices partitioning the received image sub data and delegating the partitioned image sub data to other slave computer devices.

2. The method of claim 1, wherein the step of initiating the connection from the master computer device to the remote computer device further comprising: establishing communication with the remote computer device via internet communication protocols.

3. The method of claim 1, wherein the step of receiving the image data from the remote computer device further comprising: decoding a plurality of data packets from the remote computer device into the image data.

4. The method of claim 1, wherein the step of partitioning the image data into a plurality of image sub data further comprising:
   determining number of slave computer devices connected to the master computer device;
   partitioning, based on the number determined, the image data into a corresponding number of image sub data.

5. The method of claim 4, wherein the step of delegating the image sub data to the at least two slave computer devices further comprising:
   assigning each of the image sub data, on a one-to-one basis, to each slave computer device for processing.

6. The method of claim 1, wherein the step of storing processed image sub data from the slave computer devices into the shared memory further comprising:
   allocating memory as the shared memory;
   receiving processed image sub data from each slave computer device, wherein processed image sub data corresponds to the image sub data sent to and processed by the slave computer device; and
   storing the processed image sub data into the shared memory.

7. The method of claim 6, wherein the step of transferring all processed image sub data from the shared memory into the frame buffer further comprising:
   mapping each processed image sub data from the shared memory into the frame buffer.

* * * * *